United States Patent [19]

Sittler et al.

[11] Patent Number: 4,808,009

[45] Date of Patent: Feb. 28, 1989

[54] INTEGRATED SEMICONDUCTOR RESISTANCE TEMPERATURE SENSOR AND RESISTIVE HEATER

[75] Inventors: Fred C. Sittler, Victoria; Robert C. Bohara, Eden Prairie, both of Minn.

[73] Assignee: Rosemount, Inc., Eden Prairie, Minn.

[21] Appl. No.: 870,914

[22] Filed: Jun. 5, 1986

[51] Int. Cl.[4] ............ G01N 25/04; G01K 7/22; H01C 7/00

[52] U.S. Cl. ............ 374/178; 374/164; 374/25; 338/22 SD; 338/23

[58] Field of Search ............ 374/16, 25, 141, 164, 374/178, 20; 338/22 SD, 22 R, 23, 24; 62/140; 340/598, 581

[56] References Cited

U.S. PATENT DOCUMENTS

| | | | |
|---|---|---|---|
| 3,503,030 | 3/1970 | Matsumoto et al. | 338/23 |
| 3,517,900 | 6/1970 | Roussel | 374/25 |
| 3,571,709 | 3/1971 | Gaertner | 340/581 |
| 3,614,345 | 10/1971 | Quinn | 338/23 |
| 3,621,446 | 11/1971 | Smith et al. | 338/23 |
| 3,757,808 | 9/1973 | Peterson et al. | 137/2 |
| 3,881,181 | 4/1975 | Khajezadeh | 374/178 |
| 4,009,482 | 2/1977 | Nakata | 338/22 SD |
| 4,047,436 | 9/1977 | Bernard et al. | 374/178 |
| 4,129,848 | 12/1978 | Frank et al. | 73/295 |
| 4,139,833 | 2/1979 | Kirsch | 338/308 |
| 4,269,019 | 1/1942 | Hall | 340/581 |
| 4,333,004 | 6/1982 | Forgue et al. | 219/497 |
| 4,371,861 | 2/1983 | Abdelrahman et al. | 338/25 |
| 4,445,369 | 5/1984 | Stoltman et al. | 73/204 |
| 4,478,076 | 10/1984 | Bohrer | 73/204 |
| 4,498,337 | 2/1985 | Gruner | 73/204 |
| 4,501,144 | 2/1985 | Higashi et al. | 73/204 |
| 4,548,078 | 10/1985 | Bohrer et al. | 73/204 |
| 4,559,814 | 12/1985 | Sato et al. | 73/204 |

OTHER PUBLICATIONS

Goodenough, F., "Sensor ICs: Processing, Materials Open Factory Doors," *Electronic Design*, pp. 132–148, Apr. 18, 1985.

"Fluid Meters—Their Theory and Application," Report of ASME Research Committee on Fluid Meters, *The American Society of Mechanical Engineers*, 6th Ed., 1971.

Fingerson, L. M. and P. Freymuth, "Thermal Anemometers," *Fluid Mechanics Measurements*, Ch. 4, selected pages.

Primary Examiner—William A. Cuchlinski, Jr.
Assistant Examiner—Thomas B. Will
Attorney, Agent, or Firm—Kinney & Lange

[57] ABSTRACT

An integrated sensing device includes a resistance temperature sensor formed in a semiconductor substrate and a resistance heater which is formed on an insulating layer which covers the surface of the semiconductor substrate. The resistance heater has a low temperature coefficient of resistivity and is positioned adjacent the resistance temperature sensor so the current flow through the resistance heater will generate heat which is transferred through the insulating layer to the resistance temperature sensor. The sensing device is applicable to a variety of sensing systems, such as mass flow measurement systems, dew point detection systems, and frost detection systems.

15 Claims, 3 Drawing Sheets much of it is based on the fact that the sensing device itself combines a resistance temperature sensor and heater element in close physical proximity.

INTEGRATED SEMICONDUCTOR RESISTANCE TEMPERATURE SENSOR AND RESISTIVE HEATER

BACKGROUND OF THE INVENTION

1. Field of the Invention

The present invention is related to sensing devices which are responsive to temperature, and which can be heated by the application of an electrical current. In particular, the present invention relates to an integrated semiconductor resistance temperature sensor and thin film resistance heater.

2. Description of the Prior Art

There are a number of sensing applications in which a resistance temperature sensor can be used to sense, in an indirect manner, some other parameter. One example is the sensing of mass flow of a fluid in which two resistance temperature sensors are positioned along the flow path. One of the resistance temperature sensors is heated by a flow of electrical current through that temperature sensor or by heat from an adjacent heating element. The rate of heat loss of the heated temperature sensor is dependent upon the mass flow rate past the sensor. The energy required to maintain the resistance of the heated temperature sensor at a constant value (and therefore constant temperature) is a measure of the mass flow.

In the past, hot wire anemometers have been used for this mass flow measurement. There have been, however, various attempts to develop smaller and lower cost temperature sensors for use in mass flow measurement. There remains a need for improved sensors which are low cost, are easily fabricated on a large volume reproducible basis, are very small size, and are compatable with simple and low cost drive and sensing circuitry.

SUMMARY OF THE INVENTION

The present invention is a sensing device which includes a resistance temperature sensor formed in a semiconductor substrate and a resistance heater which is formed on an insulating layer which covers the surface of the semiconductor substrate. The resistance heater has a low temperature coefficient of resistivity, and is positioned adjacent the resistance temperature sensor so that current flow through the resistance heater will generate heat which is transferred through the insulating layer to the resistance temperature sensor.

The sensing device of the present invention is capable of very low cost fabrication using well known processes common to the semiconductor industry, and can be incorporated into a very small configuration. Because the resistance temperature sensor and the resistance heater element are two separate resistances, the electrical circuitry used to drive the heater element is greatly simplified.

The sensor of the present invention is adaptable to a wide variety of different applications, both because of its low cost as well as its size. These applications include not only mass flow rate sensing, but also frost detection and dew point measurements.

DETAILED DESCRIPTION OF THE PREFERRED EMBODIMENTS

Figure 1:
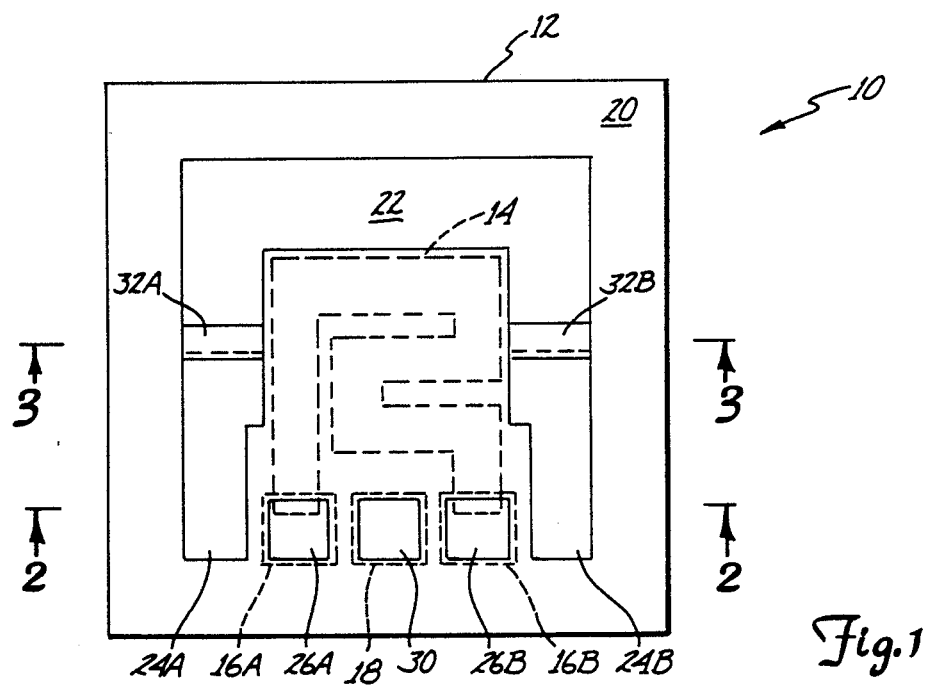
FIG. 1 is a top view of the integrated semiconductor resistance temperature sensor/thin film heater element of the present invention.
Figure 2:
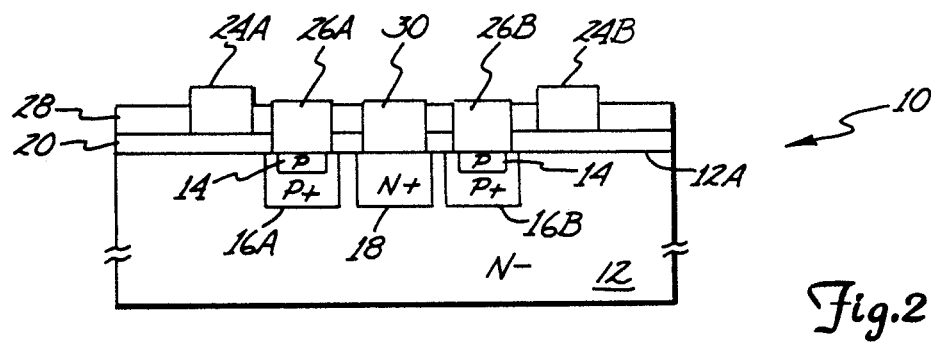
FIG. 2 is a sectional view, along section 2—2 of FIG. 1.
Figure 3:
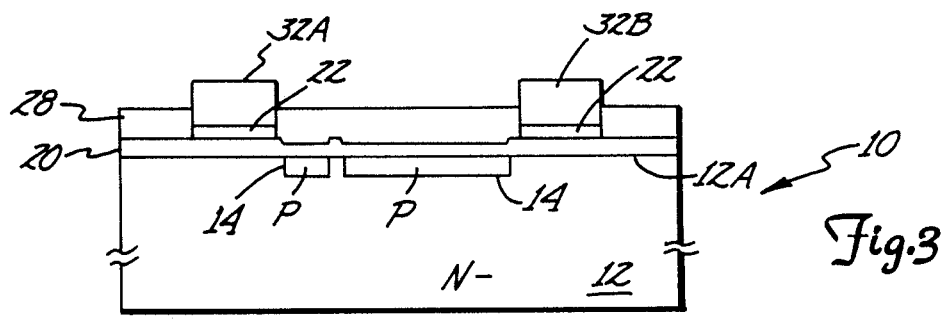
FIG. 3 is a sectional view, along section 3—3 of FIG. 1.

In the embodiments shown in FIGS. 1-3, sensor 10 is an integrated semiconductor resistance temperature sensor and resistance heater formed on and in semiconductor substrate 12. In the embodiment shown, substrate 12 is an N type substrate. Resistance temperature sensor element 14 is a lightly doped P type (P−) resistor formed in substrate 12. Located at opposite ends of sensor element 14 are P+ contact regions 16A and 16B. Electrical contact to substrate 12 is provided by N+ contact region 18.

Covering top surface 12A of substrate 12 is insulator layer 20, which is preferably a grown silicon dioxide layer. Overlying insulating layer 20 and located adjacent to temperature sensor element 14 is thin film nichrome resistance heater element 22. Aluminum contacts 24A and 24B provide contact pads for electrical connection to resistance heater 22. Aluminum contact pads 26A and 26B extend through insulating layer 20 and passivation layer 28 (which is not shown in FIG. 1 for purposes of clarity) to provide electrical connection to P+ contact areas 16A and 16B, respectively, and thus to resistance temperature sensor 14. Aluminum contact 30 provides a contact pad for connection to N+ region 18 and thus to substrate 12.

The sensor 10 of the present invention, as illustrated in FIGS. 1-3, provides a semiconductor resistance temperature sensor element 14 with a signficant temperature coefficient. Typically, temperature sensor element 14 has a resistance in the range of about 4K ohms to about 18K ohms and a temperature coefficient of resistance of about 1500 to 5000 micro ohm per ohm per degree C. This results in a significant change in resistance with temperature.

Located in close proximity is thin film resistance heater element 22, which has a low temperature coefficient (typically on the order of about 50-120 micro ohm/ohm °C.). Sensor element 14 and heater element 22 are in close physical proximity and in excellent thermal contact, while still being electrically isolated from one another by insulator layer 20.

FIG. 1 shows only one of many different configurations of temperature sensor element 14 and heater element 22. Depending upon the particular resistance value desired, sensor element 14 can have a number of different shapes. Similarly, the configuration of heater element 22 can vary depending upon the particular shape of sensor element 14.

An important advantage of the present invention is that sensor 10 can be formed using a combination of conventional semiconductor processing steps. In one preferred embodiment, N type substrate 12 is first cleaned, and then a field oxide of approximately 9,000 Angstroms is grown. The top surface is then photoshaped to define P+ diffusion areas 16A and 16B. The photoshaping involves deposition of photoresist material, exposure to a pattern, and subsequent etching to form openings through which diffusion of P type impurities can take place.

Next, the top surface is photoshaped to define sensor element 14. The diffusion of P type impurities through the opening which has been defined by photoshaping forms sensor element 14. In a preferred embodiment, the depth of sensor element 14 is about 1.5 to 4 microns.

Next, N+ substrate contact 18 is formed. The top surface is first photoshaped to provide an opening in the oxide layer, and N type impurities are diffused to form an N+ region 18.

As each diffusion step takes place, the thermal oxide layer 20 grows. As shown in FIGS. 2 and 3, the thermal oxide layer 20 over sensor 14 is not as thick as over other areas of substrate 12 because the field oxide and the additional thermally grown oxide created during the P+ diffusion was removed from the area overlying sensor element 14 during the photoshaping for the P diffusion which formed sensor element 14.

Next, the top surface is photoshaped to form holes through oxide layer 20 to substrate contact region 18 and to sensor contact regions 16A and 16B.

A nichrome layer is then deposited over the top surface. In a preferred embodiment, the nichrome layer has a thickness of about 500–2500 Angstroms. The nichrome is then photoshaped to form heater element 22 having a preferred resistance between 50 ohms and 200 ohms.

A silicon dioxide passivation layer 28 is then deposited over the top surface. Passivation layer 28 preferably has a thickness on an order of about 0.4 to 1.0 micron. Holes are photoshaped through passivation layer 28 to permit contact to diffusion contact areas 16A, 16B, 18 and over contact areas 32A and 32B of heater element 22.

An aluminum layer of about 1 micron thickness is then deposited over the top surface of the device. Because of the openings which have been defined by photoshaping, the aluminum layer makes contact with contact areas 16A, 16B, 18, 32A and 32B. The aluminum layer is then photoshaped to define contacts 24A and 24B (which connect to opposite ends of heater element 22), aluminum contacts 26A and 26B (which connect to opposite ends of sensor element 14), and aluminum contact 30 which makes electrical contact to substrate 12 through diffusion area 18. Substrate 12 is biased positive with respect to the diffused resistances to minimize the flow of current from the diffused resistances to the substrate 12. The aluminum contacts are then annealed to improve their electrical contact characteristics.

Typically, this process is performed on a batch basis, with a large number of sensors 10 being formed on a common semiconductor wafer. The final step of the process, in that case, is the severing of the individual sensors 10 from the wafer.

Figure 4:
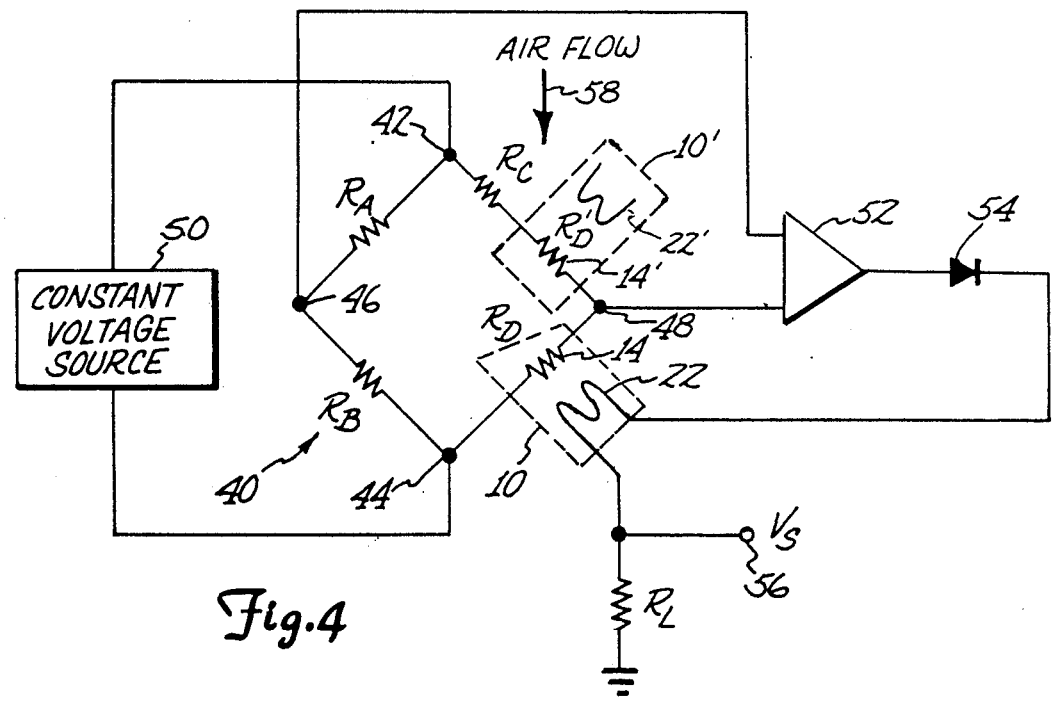
FIG. 4 is a schematic diagram showing one embodiment of flow sensing circuitry used in conjunction with the integrated sensing device of the present invention.

FIG. 4 shows a schematic diagram of a thermal mass flow detection system using the present invention. In FIG. 4, two sensors like the ones shown in FIGS. 1-3 are used. Sensor 10 makes use of both temperature sensor 14 and heater 22, while sensor 10' is used only as an ambient temperature sensor and, therefore, uses only the temperature sensor 14'. The heater element 22' of sensor 10' is simply not used.

Temperature sensor 14 (which has a resistance $R_D$) and temperature sensor 14' (which has a resistance $R_D'$) are connected in a resistance bridge 40 with resistors $R_A$, $R_B$, and $R_C$. Bridge 40 has a pair of input terminals 42 and 44 and a pair of output terminals 46 and 48. Resistance $R_A$ is connected in the leg of bridge 40 between terminals 42 and 46. Resistance $R_B$ is connected in the leg of bridge 40 between terminals 44 and 46. Resistance $R_D$ (i.e. temperature sensor 14) is connected in the leg of bridge 40 between terminals 44 and 48. Resistance $R_C$ and resistance $R_D'$ of temperature sensor 14' are connected in series in the leg of bridge 40 between terminals 42 and 48.

Constant voltage source 50 is connected to input terminals 42 and 44 of bridge 40 to provide a constant voltage excitation to bridge 40. Output terminals 46 and 48 are provided to inputs of op amp 52. Diode 54 rectifies the output of op amp 52 to prevent inadvertant heating in the no flow condition and to provide an excitation current $I_H$ to heater element 22. Load resistor $R_L$ is connected in series with diode 54 and heater element 22. Output terminal 56 is connected to the junction between heater element 22 and resistor $R_L$ to provide an output voltage $V_S$, which is representative of the heater excitation current $I_H$, to a readout or a control system.

Arrow 58 in FIG. 4 shows the direction of airflow past sensors 10' and 10. In the embodiment shown in FIG. 4, sensor 10', which detects ambient temperature, is positioned upstream of sensor 10. The output of the circuit (voltage $V_S$) is proportional to the thermal mass flow across temperature sensor element 14.

If a small temperature change ($\Delta T$) is required for flow sensing, and $R_C + R_D' = R_D$, then $R_C = R_D(\alpha \Delta T + \sigma[\Delta T]^2)$ where $\alpha$ and $\sigma$ are the temperature coefficients of the sensing resistors material of $R_A$, $R_B$, $R_D$, $R_C$, and $R_D'$. In essence, the open-loop amplifier 52 will drive heater 22 to heat $R_D$ until the bridge 40 nulls. If $R_A = R_{B2}$ then null will occur when $R_D(1 + \alpha \Delta T + \sigma[T]^2) = R_C + R_D'$. Hence a constant $\Delta T$ will be developed. Then, via King's Law, $I_H$, and hence $V_S$, is proportional to the square root of the thermal mass flow across $R_D$.

As can be seen, the circuit shown in FIG. 4 is extremely simple. This is due, in large part, to the fact the heater element 22 is electrically isolated from temperature sensor element 14.

In other embodiments of the present invention, resistors $R_A$, $R_B$, $R_C$, and $R_L$ are all nichrome resistors formed on sensors 10 and 10', which further reduces the cost of the total circuit. Because they are nichrome resistors, resistors $R_A$, $R_B$, $R_C$, and $R_L$ have a low temperature coefficient and are substantially not affected by the heat from heater element 22 or the airflow passing over sensors 10 and 10'.

In addition, it is possible to package sensors 10 and 10' in a common package. Since the cost of the package is typically ten times the cost of the sensor 10 or 10', the use of a common package for both sensors results in a significant cost reduction.

The embodiment shown in FIG. 4 can be alternatively construed to comprise four sensors, such as sensor 10, in the airflow to obtain twice the sensitivity in comparison to the circuit with two sensors. In such an alternative embodiment, the resistances $R_A$, $R_B$, $R_D$, and $R_D'$ are all sensing resistors and the output of amplifier 52 is coupled to the heater 22 associated with resistance $R_D$ and also to a heater associated with resistance $R_A$.

The embodiment of the integrated sensor 10 shown in FIGS. 1-3 is only one of many different arrangements possible for both temperature sensor element 14 and heater element 22. Other configurations are also possible, depending upon the desired resistance values and the thermal characteristics which are desired. With the use of a thin nichrome layer as a heater element, the present invention offers the opportunity to provide additional thin film resistors formed at the same time as heater element 22 and which may be used for trimming of resistance values.

The unique combination of semiconductor and metal film resistance technologies to form the integrated temperature sensor/heater element of the present invention has numerous advantages over existing devices. First, control of heating element 22 is simplified since its temperature coefficient of resistance is negligible. For example, a simple constant voltage circuit can maintain a constant power output from heating element 22.

Second, utilizing semiconductor resistance temperature sensor element 14 offers a high temperature coefficient of resistance and a high ice point resistance in a very compact area.

Third, utilizing separate temperature sensor and heater elements 14 and 22, as opposed to a self heated temperature sensor, greatly simplifies direction, and when created in two different technologies (as with the present invention in which the heater element is formed with a thin film technology and the temperature sensor element is formed with a diffusion technology) offers significant electrical isolation between power elements and sensitive detection electronics.

Fourth, integration on the same substrate allowed by the present invention allows maintenance of necessary close thermal contact between heater element 22 and sensor element 14.

Fifth, the present invention allows batch fabrication of the complete integrated temperature sensor/heater element assembly for a very low cost.

Sixth, the present invention allows resistance trimming of both the heater element 22 and the sensor element 14 with trim networks of the same respective materials so that temperature coefficients of the elements are not degraded.

Seventh, with little cost penalty, the same sensor can be used for the two different functions necessary for mass flow rate measurement.

Eighth, because of the different technologies used to form sensor element 14 and heater element 22, it is possible to independently optimize the temperature coefficient and the resistance characteristics of both heater element 22 and sensor element 14. In other words, performance tradeoffs—which are necessary when the same materials and technologies are used for both types of elements—are avoided.

Ninth, because the resistance of temperature sensor elements is high (typically 4K to 18K ohms) and the temperature coefficient is also relatively high, a large change in resistance occurs with a change in temperature. This simplifies detection when compared to other resistance temperature sensors having much lower resistances.

Tenth, there are a number of applications for the integrated temperature sensor/heater element in addition to the mass flow rate measurement application described above. For example, combining sensor 10 with some kind of cooling unit and monitoring for a flat spot in the heating and cooling curve can be used to determine dew point.

Figure 5:
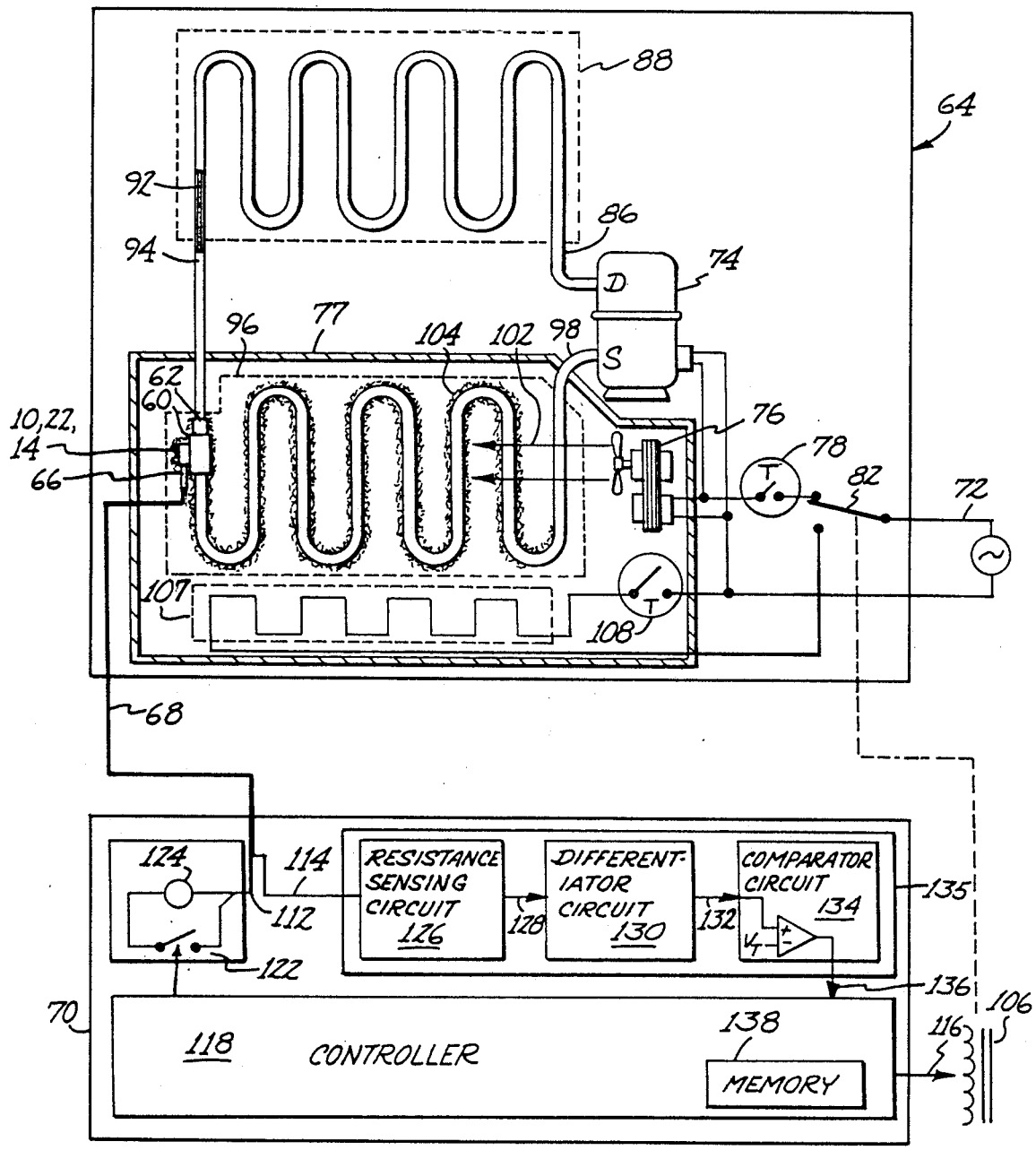
FIG. 5 is a diagram showing a frost sensor system using the integrated sensing device of the present invention.

FIG. 5 shows another application of the sensor of the present invention: as a frost detector for use in a refrigerator. Frost sensing is important in air conditioning and refrigeration as an indication of system failure or the need for maintenance. The embodiment shown in FIG. 5 is aimed at the refrigeration application, and in particular at detecting frost for the purpose of beginning a defrost cycle. Frost-free refrigerators have, in the past, typically performed a defrost cycle based purely on time, or by counting the number of times that the refrigerator or freezer door is opened. Neither of these prior art techniques directly measure frost accumulation and, therefore, can result in defrost cycles being initiated when not needed, and in the failure to initiate a defrost cycle when frost accumulation warrants a defrost cycle. Other frost detection techniques, such as those using optical sensing, can be contaminated by dirt or by thin films of oil. For those reasons, the use of these techniques in the context of a refrigerator has not been practical.

In FIG. 5, a sensor 10 is mounted by clip 60 in close thermal contact with a section of evaporator tubing 62 in a mechanical refrigeration of evaporator tubing 62 in a mechanical refrigeration system 64. Preferably, sensor 10 is disposed at a point most susceptible to frost accumulation. Electrical connector 66 provides connection through multiconductor cable 68 to control system 70.

Refrigeration system 64 is energized from an energization source 72 such as an AC powerline. A compressor assembly 74 and a freezer compartment fan 76 in a freezer compartment 77 are energized when a thermostat 78 is closed by a rise in a freezer compartment temperature in the normal operation of system 64. During the normal operation, relay contact 82 is in the normally closed position as depicted in FIG. 5. Compressor 74 discharges hot refrigerant gas at an elevated pressure from discharge pipe 86 into a condenser coil 88. The refrigerant gas gives up heat and is cooled in condenser coil 88 and condenses to form liquid refrigerant 92 at the bottom of the condenser coil 88. Liquid refrigerant 92 flows from the condenser 88 to an evaporator 96 through a capillary tube 94. The capillary tube 94 controls the flow of liquid refrigerant 92 and provides a desired pressure drop along its length. Compressor 74 pumps refrigerant out from evaporator 96 through suction line 98, thus maintaining a desired reduced pressure in evaporator 96. Liquid refrigerant 92 enters evaporator 96 from capillary 94 and evaporates or boils in the reduced pressure thus cooling the evaporator 96. Fan 76 directs moisture laden air 102 from inside the refrigerator across evaporator 96 and sensor 10 providing desired cooling to the air in the refrigerator and depositing frost 104 on evaporator 96 and sensor 10. As frost 104 accumulates on evaporator 96, it insulates the evaporator 96 from the air 102, thus reducing heat transfer and the efficiency of the system 64.

When relay contact 82 is actuated by relay coil 106, the normal operation of the refrigeration system 64 is interrupted and defrost heater 107 is energized. Defrost heater 107 is in close thermal contact with evaporator 96 and provides heat to evaporator 96 during a defrost time interval to melt accumulated frost which is drained off and the efficiency of the system 64 is thus restored. A thermostat 108 senses the temperature of the evaporator 96 and opens at a selected temperature to prevent overheating of the evaporator during the defrost time interval. The heater 107 consumes a substantial amount of energy during the defrost cycle. Hence, it is desired to have a control system which conserves energy by initiating a defrost time interval only when there is a sufficient accumulation of frost 104 on evaporator 96 to substantially impair the efficiency of system 64.

Control system 70 is coupled along lines 112 and 114 to sensor 10 for sensing the accumulation of frost on sensor 10. The accumulation of frost on sensor 10 is a representative sample of the accumulation of frost on evaporator 96 since sensor 10 is in close thermal contact with evaporator 96 through clamp 60 and is also in the flow of air 102. Control system 70 is coupled to relay coil 106 along line 116 to control actuation of relay contacts 82. Thus control system 70 controls initiation and stopping of the defrost time interval in response to frost accumulation and provides for efficient operation of system 64 and reduced consumption of energy by heater 108.

Figure 6:
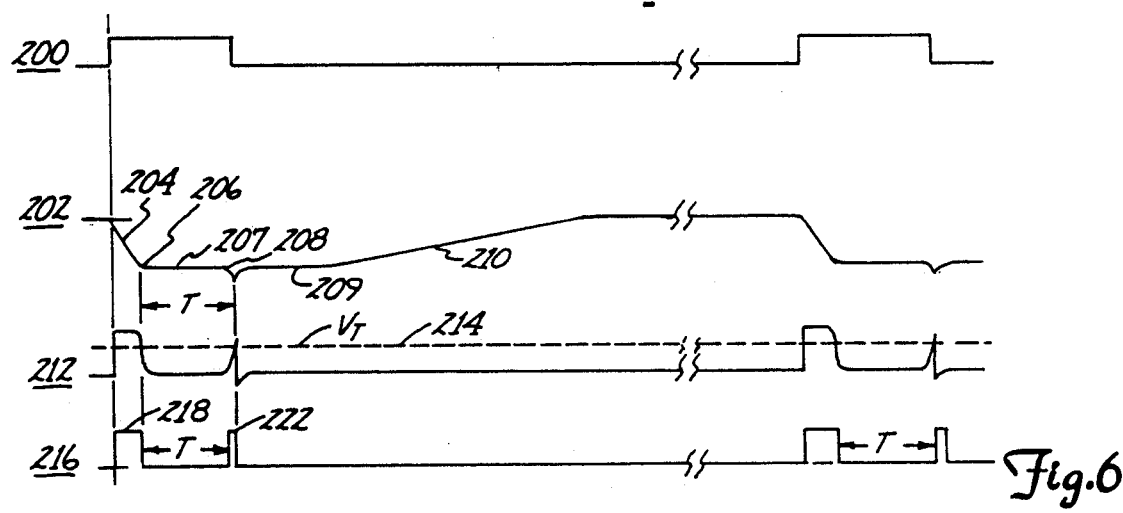
FIGS. 6 and 7 are timing diagrams showing two alternative modes of operation of the system of FIG. 5.

As illustrated in FIG. 5 and a timing diagram shown in FIG. 6, controller 118 actuates switch 122 in control system 70, thus applying constant voltage source 124 along line 112 to heater 22 of sensor 10. The energization waveform as a function of time on line 112 is shown at 200 in FIG. 6. Temperature sensor element 14 (as explained in connection with FIG. 1) of sensor 10 is coupled by line 114 to resistance sensing circuit 126, which preferably comprises a resistance bridge circuit. Circuit 126 has an output 128 which provides a signal representative of the temperature of sensor 10. Waveform 202 shown in FIG. 6 (which is the signal at output 128) decreases along segment 204 as the temperature of sensor element 14 increases to a melting or sublimation temperature of ice at 206. Once the melting temperature of ice is reached, the heat applied by heater element 22 to sensor element 14 is consumed in supplying the latent heat of fusion to melt the frost on the sensor's surface. This results in a relatively stable or flat temperature of the sensor near zero degrees centigrade while ice and frost on the sensor are melted as shown at 207 in FIG. 6. Since heater element 22 has a low temperature coefficient of resistance, at a constant voltage input the power is constant, and thus, the length of a time interval "T" shown in FIG. 6 during which melting occurs is representative of the quantity of ice and frost accumulated on the sensor independent of the structure of the frost. When substantially all of the ice and frost on the sensor are melted, the temperature of the sensor element 14 begins rising again as shown at 208 in FIG. 6. Controller 118 senses this rise and heater element 22 is de-energized at this point and the water on sensor 10 refreezes during time interval 209 and then the temperature of sensor element 14 drops back to a normal subfreezing temperature along line 210 in FIG. 6.

The signal at output 128, which is thus representative of the temperature of sensor element 14, is coupled to an electrical differentiator circuit 130 which differentiates the signal from output 128 with respect to time. A differentiator output 132 has a waveform as shown at 212 in FIG. 6. The differentiator output 132 is coupled to a comparator circuit 134 which compares the differentiator output 132 to a selected threshold level VT shown at 214 in FIG. 6. The comparator provides a comparator output 136 having a waveform shown at 216 in FIG. 6. The comparator output comprises a pulse 218 and a pulse 222 during each energization of the heater element 22. The time interval T between these two pulses is representative of accumulation of ice and frost on sensor 10. The circuitry 126, 130 and 134 thus comprise a slope analyzer 135 which analyzes the time rate of change or slope of the resistance of sensor element 14 of sensor 10. The comparator output 136 is coupled to controller 118, and controller 118 compares the time interval T to a selected value in memory 138. If the time interval T exceeds the selected value in memory, ice has accumulated to an undesirable level and controller 118 couples a signal to line 116 to energize relay coil 106 for a defrost time interval. The defrost time interval is controlled by the controller 118 according to a constant stored in memory 138. Controller 118 can comprise a conventional microcomputer system programmed to perform the desired logic, timing and memory functions.

When control system 70 is operated according to the timing diagram shown in FIG. 6, the frost and ice continue to accumulate on sensor 10 until it reaches an undesirable amount, at which point a defrost time interval is initiated to remove frost and ice from evaporator 96 including sensor 10.

Figure 7:
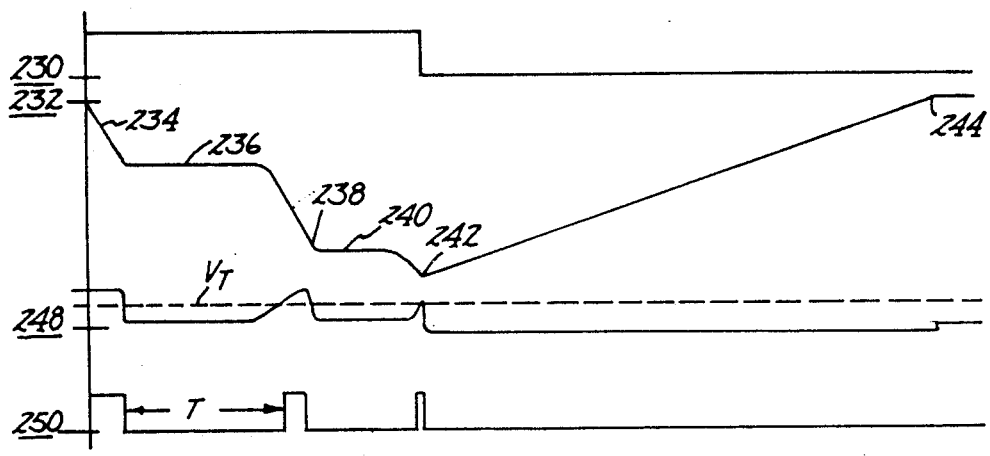

Control system 70 can be operated in an alternate manner as shown in FIG. 7 to remove substantially all of the ice from sensor 10 each time the heater element 22 of sensor 10 is energized. In FIG. 7, an energization waveform 230 is representative of the potential applied to heater element 22 on line 112. Heater 22 is energized to heat element 14 of sensor 10 up to the melting temperature as shown at 234 on waveform 232; the ice on sensor 10 melts as shown at 236; the sensor heats up to near the vaporization point of water as shown at 238 and vaporizes off the water as shown at 240. A further rise in temperature of the sensor element 14 is sensed by the controller 118 as shown at 242 and the heater element is shut off and the sensor 10 returns to its normal subfreezing temperature at 244. The differentiator 130 provides a differentiator output 132 with a waveform as shown at 248 in FIG. 7, and the comparator 134 provides a comparator output with a waveform as shown at 250 in FIG. 7. The time interval "T" at the comparator output is representative of the amount of ice or frost vaporized from sensor 10. A quantity representative of the length of time interval T is added to an accumulation in memory 138 for each cycle of the heater element 22 and when this accumulation reaches a selected level over many actuation cycles of the heater element 22, the defrost time interval is initiated and timed by controller 118. The accumulation in memory 138 is reset to zero during the defrost interval such that controller 118 is ready to again start accumulation of quantities representative of time intervals T at the end of the defrost time interval.

Using the sensor 10 in the accumulation rate mode as shown in FIG. 7 can give a reading of accumulation amount each time it is cycled. This is because sensor 10 is quite small and because frost tends to obey laws of equilibrium. That is, the frost will tend to migrate to the just defrosted sensor from the frost covered tubing section 62 because sensor 10 will become colder on the surface than the nearby frost covered tubing.

In conclusion, the present invention is a sensor which offers significant advantages in a wide range of different applications. Its low cost, compatibility with simple detection circuitry, and its small size provide opportunities for widespread use.

Although the present invention has been described with reference to preferred embodiments, workers skilled in the art will recognize that changes may be made in form and detail without departing from the spirit and scope of the invention.

What is claimed is:

1. A sensor comprising:
   a semiconductor substrate;
   an electrical insulating layer covering a first surface of the substrate;
   a semiconductor resistance temperature sensor formed in the semiconductor substrate adjacent the first surface of the substrate;
   a film resistance heater having a low temperature coefficient of resistivity formed on the insulating layer adjacent the temperature sensor;
   first contact means for providing electrical connection to the temperature sensor; and
   second contact means for providing electrical connection to the resistive heater.

2. The sensor of claim 1 wherein the semiconductor substrate has a first conductivity type and the temperature sensor has a second conductivity type.

3. The sensor of claim 1 wherein the resistance heater comprises a thin film resistance element.

4. The sensor of claim 3 wherein the thin film resistance element is nichrome.

5. The sensor of claim 4 wherein the thin film resistance element has a thickness of about 500 to about 2500 Angstroms.

6. The sensor of claim 1 wherein the electrical insulating layer is silicon dioxide.

7. The sensor of claim 6 wherein the electrical insulating layer has a thickness of about 3000 to about 10,000 Angstroms.

8. The sensor of claim 1 and further comprising a passivation layer covering the resistance heater.

9. The sensor of claim 1 wherein the semiconductor substrate is silicon.

10. The sensor of claim 9 wherein the resistive temperature sensor has a resistance of about 4,000 to about 18,000 ohms.

11. The sensor of claim 1 and further comprising:
    means connected to the first contact means for sensing resistance of the temperature sensor; and
    means connected to the second contact means for supplying an electrical signal to the resistance heater.

12. The sensor of claim 11 and further comprising:
    means for positioning the sensor adjacent a surface susceptable to frost accumulation.

13. The sensor of claim 12 and further comprising:
    means for measuring a time period during which the resistance of the temperature sensor does not significantly change although the electrical signal is being supplied to the heater.

14. A frost sensor comprising:
    a detector including a resistance heater having a low temperature coefficient of resistivity and a temperature sensor having a higher temperature coefficient of resistivity positioned adjacent one another;
    means for positioning the detector adjacent a surface susceptible to frost accumulation;
    means for applying an electrical signal to the heater to heat the detector to a temperature at least equal to a melting point of frost for melting frost formed on the detector; and
    means responsive to changes in resistance of the temperature sensor as a result of heat produced by the heater for deriving a signal which is a function of frost accumulation on the detector, based upon the resistance of the temperature sensor exhibiting an insignificant change during a time period in which the frost formed on the detector is melted.

15. The frost sensor of claim 14 wherein the means responsive to changes includes:
    means for
    analyzing a time rate of change of the resistance of the temperature sensor to measure the time period during which the resistance of the temperature sensor does not significantly change although the electrical signal is not supplied to the heater during the time period.

* * * * *

UNITED STATES PATENT AND TRADEMARK OFFICE
CERTIFICATE OF CORRECTION

PATENT NO. : 4,808,009

DATED : February 28, 1989

INVENTOR(S) : Fred C. Sittler

It is certified that error appears in the above-identified patent and that said Letters Patent is hereby corrected as shown below:

Column 4, line 18, delete "inadvertant" and insert "inadvertent"

Column 5, line 26, delete "direction" and insert "detection"

Column 5, line 57, delete "elements" and insert "element"

Column 6, lines 25-26, delete "of evaporator tubing 62 in a mechanical refrigeration"

Signed and Sealed this

First Day of August, 1989

Attest:

DONALD J. QUIGG

Attesting Officer

Commissioner of Patents and Trademarks